June 29, 1965 R. G. LANGRELL 3,191,786

HAND TRUCK

Filed April 8, 1963

INVENTOR.
RICHARD G. LANGRELL
BY Eugene M. Eckelman
ATTORNEY

3,191,786
HAND TRUCK
Richard G. Langrell, 2110 Broadway, Baker, Oreg.
Filed Apr. 8, 1963, Ser. No. 271,128
4 Claims. (Cl. 214—370)

This invention relates to new and useful improvements in hand trucks, and more particularly is concerned with a hand truck especially designed to pick up and handle heavy rolls of linoleum.

A primary objective of the present invention is to provide a hand truck of the type described which by its structure can be operated to manipulate heavy rolls of linoleum without requiring great strength on the part of an operator.

Another object of the present invention is to provide a hand truck of the type described having adjustable wheel means and drive means therefor whereby the truck is adapted to be positioned so as to engage a linoleum roll in a vertical position and to lower the roll to a horizontal position for unrolling the lineoleum.

More particular objects of the present invention are to provide a hand truck for handling rolls of linoleum which employs front and rear wheel assemblies movable relative to a linoleum supporting frame such that in one position the frame is in vertical position to facilitate picking up a roll of linoleum from a vertical position and such that in another position the lineoleum roll is lowered to a horizontal position and in such latter position the wheel assemblies shift rearwardly to shift the center of gravity of the truck to better support the linoleum; and which employs a winch and pulley assembly for moving the wheel assemblies.

Briefly stated the present invention comprises a linoleum engaging frame supported on wheel assemblies comprising front and rear wheels. These wheel assemblies are pivotally supported on the linoleum engaging frame for adjustable movement relative to the latter and relative to each other whereby the lineoleum engaging frame is adapted for movement between vertical and horizontal positions to facilitate novel support of the roll.

The invention will be better understood and additional objects thereof will become more apparent from the accompanying drawings, wherein like numerals of reference indicate like parts, and wherein.

Figure 3:
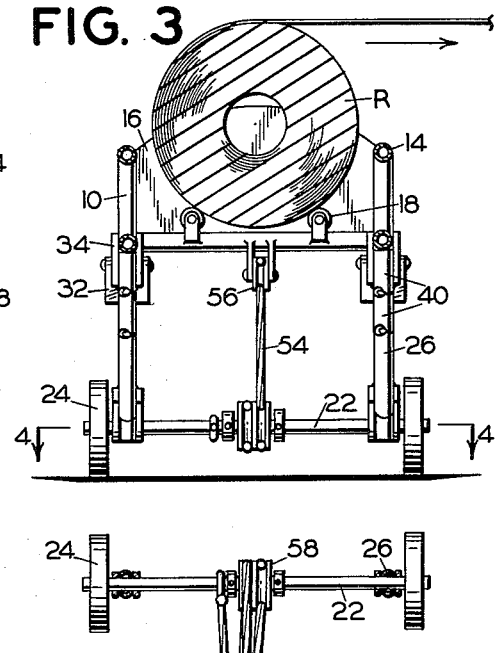
FIGURE 3 is a transverse sectional view taken on the line 3—3 of FIGURE 2.

Referring now in particular to the drawings, the numeral 10 designates the main frame of the hand truck and comprises in general a cradle-type structure adapted longitudinally to receive a roll R of lineoleum. Such frame has bottom cross pieces 12 and longitudinal rails 14 for confining the roll of linoleum, and furthermore the lower end of the frame has a projecting foot plate 16 for engaging under a roll of linoleum. Cross pieces 12 are provided with rollers 18 by means of which the roll of linoleum may be rotated on the truck to unroll the linoleum when the frame 10 is shifted to a horizontal position as seen FIGURES 2 and 3.

Frame 10 has wheeled support on front and rear wheel assemblies. The front wheel assembly comprises a transverse axle or shaft 22 on which is mounted a pair of wheels 24. Pivotally connected to the axle 22 is a pair of arms 26 the opposite ends of which are pivotally connected to the main frame 10, as to longitudinal rails 14, by pivot pins 28.

Also pivotally mounted on axle 22 are links 30. These links extend rearwardly and their opposite ends carry yokes 32 the arms of which extend on opposite sides of pivot brackets 34 for pivotal connection thereto by pivot pins 36. Importantly, the links 30 are connected to the pivot brackets at a point intermediate the ends of the latter.

Brackets 34 are pivotally connected to the main frame 10, as to rails 14, by pivot pins 38, and secured integrally to the brackets 34 are rear legs 40 pivotally connected at their outer ends to rear shaft 42 having a pair of wheels 44. Rear legs 40 are of a greater length than the front legs whereby when the legs are pulled together the frame tilts upwardly.

Figure 1:
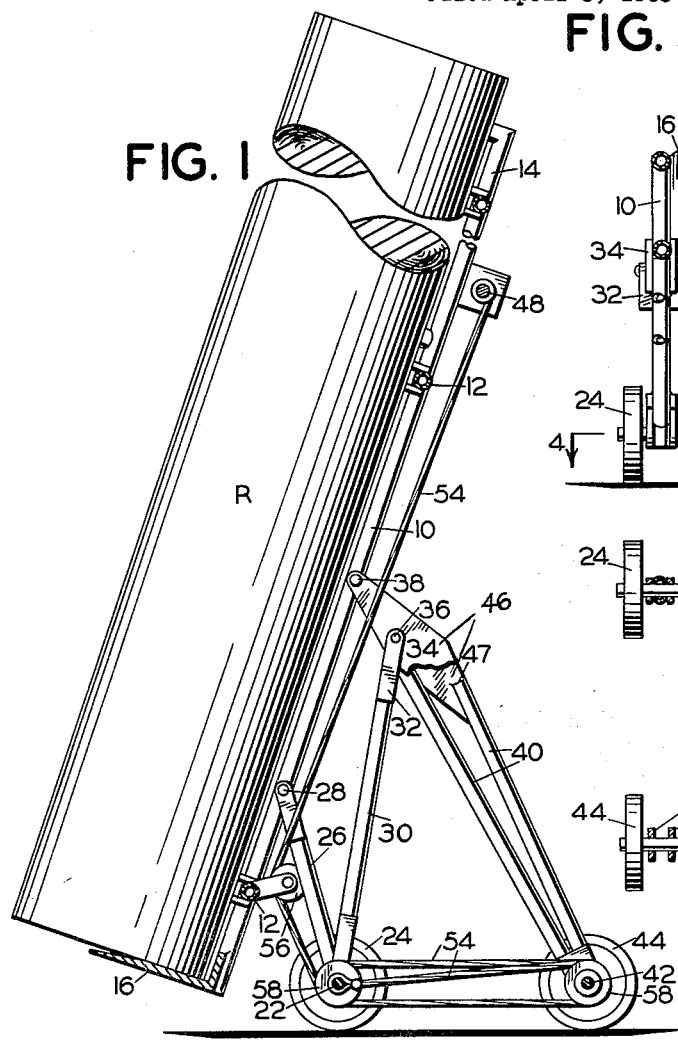
FIGURE 1 is a longitudinal, central sectional view of the hand truck with a linoleum roll thereon and supporting such a roll in vertical position.
Figure 4:
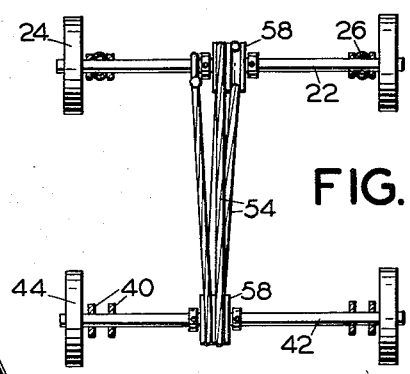
FIGURE 4 is a sectional view taken on the line 4—4 of FIGURE 3.
Figure 2:
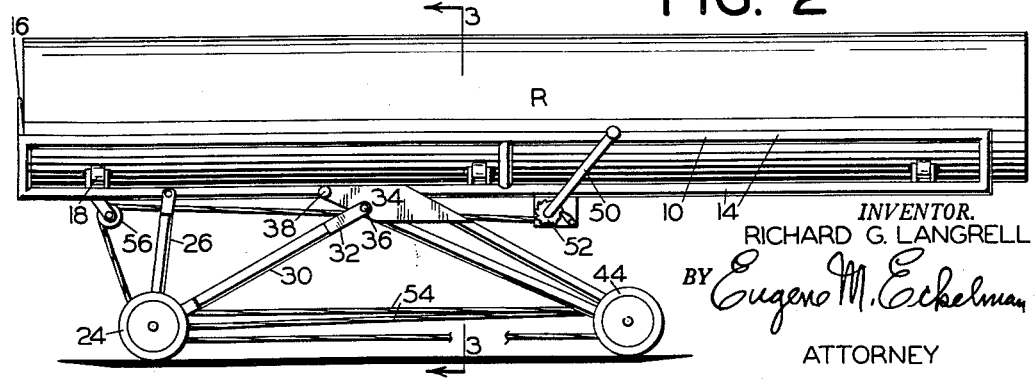
FIGURE 2 is a side elevational view of the truck but showing it supporting a linoleum roll in horizontal position.

In the preferred construction shown, each of the pivot brackets 34 comprises a pair of plates 46 integrated by connection as by welding to opposite sides of the rear legs 40 and capable of receiving therebetween the rail 14 of frame 10 to which it is pivotally connected in a horizontal position of the latter as seen in FIGURE 2. Also as seen in FIGURE 1, wherein one of the side plates 46 is broken away, one of the legs 40 has an upper end 47 which terminates interiorly of the bracket whereby in the horizontal position of the frame 10, the rail 14 which lies between the plates abuts against the end 47 of the leg 40 to serve as a support for the frame in addition to pivot point 38.

By the arrangement of the pivot brackets 34, and other pivoting means, the wheel assemblies are movable relative to the frame and relative to each other to position the frame 10 in an upright position as seen in FIGURE 1, or a horizontal position as seen in FIGURE 2.

Adjustment of the wheel assemblies is accomplished by a winch 48 rotatably mounted on the frame 10 and operated by a crank handle 50. Such winch is of conventional construction and may employ ratchet means 52 for controlling its operation. Operatively connected to the winch 48 is a cable 54 extending downwardly from the winch and operating over a first pulley 56 connected to the frame adjacent the front axle 22. The cable 54 then engages a series of pulleys 58 rotatably mounted on the front and rear axles. It is preferred to have a low drive ratio arrangement of pulleys in order that adjustment of the leg assemblies is easily accomplished, and thus a woman clerk can readily manipulate the hand truck in the necessary operations.

By the arrangement of pivoting mechanism and connection for the leg assemblies, namely, the connection of the links 30 and the pivot brackets 34 wherein said arms are connected to the brackets at a position spaced from the pivot point for the latter, the front leg assembly is pulley rearwardly when the frame is lowered. It is evident therefore that even though the length of the legs is kept to a minimum a sufficient shifting is nevertheless accomplished to provide support rearwardly of the center of gravity of the roll to prevent tipping of the truck. Also, by the arrangement shown and described the wheels are brought into compact relation in the vertical position of the frame for easy handling and maneuverability, as shown in FIGURE 1, and the front wheels are closely adjacent the frame in such vertical position to provide easy tilting of the frame in loading and unloading a roll in hand truck fashion.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A hand truck comprising an elongated frame, a foot plate on the lower end of the frame for supporting an elongated article adapted to be placed on said elongated frame, front leg means pivotally connected to said frame, wheel means on said front leg means arranged to serve as pivot means for tilting the truck in article loading and unloading, rear leg means pivotally connected to said frame rearwardly of the pivot connection of said front leg means to said frame, the rear leg means being of greater length than said front leg means whereby the frame is tilted through different angles relative to the horizontal by varying the distance between said front and rear leg means, wheel means on said rear leg means, link means pivotally connected between said front leg means and said rear leg means, said link means being connected to said rear leg means at a point spaced from the point of pivot connection of said rear leg means with said frame and being of greater length than the distance between the pivot connections of said front and rear leg means whereby upon rearward pivot movement of said leg means, said front and rear leg means spread apart and both pivot rearwardly relative to the frame, and drive beans interconnected between said front and rear leg means for varying the distance between said leg means.

2. The hand truck of claim 1 wherein said drive means includes winch means on said frame, pulley means on said front and rear leg means, and a cable connected to said winch means and reeved over said pulley means for pulling said front and rear leg means together upon rotation of said winch means.

3. The hand truck of claim 1 including elongated pivot bracket means pivotally connecting said rear leg means to said frame and pivotally connected to said link means.

4. The hand truck of claim 1 wherein said front wheel means are pivotally connected to the frame closely adjacent the lower end of the latter and are arranged when said front and rear leg means are pivoted together in closely spaced relation in a position closely adjacent said lower end of the frame.

References Cited by the Examiner
UNITED STATES PATENTS

| | | | |
|---|---|---|---|
| 380,335 | 4/88 | Loree | 280—43.16 X |
| 1,431,862 | 10/22 | Allebrand et al. | 214—77 X |
| 1,697,364 | 1/29 | McCollum et al. | |
| 1,789,391 | 1/31 | Roe. | |
| 1,887,134 | 11/32 | Johancen et al. | 254—3.2 X |

HUGO O. SCHULZ, *Primary Examiner.*

GERALD M. FORLENZA, *Examiner.*